UNITED STATES PATENT OFFICE.

TAINE G. McDOUGAL AND SAMUEL J. McDOWELL, OF FLINT, MICHIGAN, ASSIGNORS TO CHAMPION IGNITION COMPANY, OF FLINT, MICHIGAN, A CORPORATION OF MICHIGAN.

SYNTHETIC JEWEL BEARING.

1,422,216.  Specification of Letters Patent.  Patented July 11, 1922.

No Drawing.  Application filed January 14, 1920. Serial No. 351,436.

*To all whom it may concern:*

Be it known that we, TAINE G. McDOUGAL and SAMUEL J. McDOWELL, citizens of the United States, and residents of Flint, county of Genesee, and State of Michigan, have invented certain new and useful Improvements in Synthetic Jewel Bearings, of which the following is a full, clear, concise, and exact description, such as will enable others skilled in the art to which the invention relates to make and use the same.

The present invention relates to jewel bearings such as are adapted for use in speedometers and other instruments, the object being both to improve the quality of the bearing and to materially reduce its cost. In other words, the invention is concerned with a process of manufacture as well as with the bearing itself. Both aspects of the invention will, it is thought, be best understood by a description of the several steps with which its manufacture, as involved in the preferred practice, may be divided:

1st. The formation of a glass of a highly viscous nature when fused which serves as the base from which the bearings are made and which allows a better control of the shrinkage (that results from subsequent treatment) than could otherwise be obtained with the raw ingredient or ingredients composing the glass batch. This glass may be formed of various materials or combinations of materials, but it is fundamentally important to the success of the process that it be very viscous when fused, since a bearing of such material will retain its shape during the burning or hardening process and will moreover present a smooth surface such as avoids any necessity for polishing subsequently to the heat treating operation. Manifestly, this glass should also be of a very hard nature when cooled to normal temperature. One form of such glass may be made from raw pulverized feldspar (mined as a crystalline rock and ground to pass a screen of say one hundred meshes to the inch) as it is commonly prepared for the pottery trade, but it is desirable to add a hardening material, preferably about twenty per cent of clay. Feldspar alone melts at about 1250° C., but for the incorporation of clay therewith by fusion a much higher temperature, namely, about 1400° C. is necessary. This temperature is also much higher than is subsequently used in fusing the bearing shapes.

2nd. The glass or pre-melted material so formed is ground to a very fine powder, which may be accomplished in any desired manner.

3rd. After grinding, the powder is granulated by dampening with a solution of dextrin or other suitable binding material, and is then preferably rubbed through a rather coarse screen (say sixty meshes to the inch) while in this damp condition. This step is the first one that would be necessary should raw feldspar, as ground for the pottery trade, be used.

4th. The granulated material is then dried and preferably screened to remove all particles too large or too small, as, for example, by being passed through a screen of sixty meshes per inch and also through a screen of one hundred fifty meshes per inch so that the material finally retained is of a quite uniform size and small enough to permit free flow into the dies or press.

5th. The dry granulated material thus formed is then fed into suitable hardened dies whereby it is compressed and properly shaped; and in order to reduce the wear on the dies, a small amount of kerosene or the like is preferably mixed with the powder for lubricating purposes.

6th. After being discharged or removed from the press, the shapes or pellets, which are ordinarily of ring formation, are then received or placed in refractory trays, the bottoms of which are covered with a layer of finely divided powder of some material, preferably aluminum oxide, which forms a bed therefor and which will not adhere to the jewels or chemically combine therewith during the firing or fusing process. The jewels are thus free to shrink and do not become fused with the powder or attached thereto.

7th. The shapes are next heated to cause fusion, said treatment being arrested at a point such as to give the size desired and to insure the finish or polish necessary to insure a bearing with minimum friction. In this operation the material is heated sufficiently to cause what is technically called fusion but not sufficiently to cause deformation, the actual temperature being dependent somewhat on the particular material used, and being determined by two considerations, namely, the formation of a satisfactory fused surface and, second, the retention of the shape to which the pellet or ring was originally compressed. If the heating is too low, the surface will be rough, and if the heating is too high the bearing will be deformed. The bearings are then annealed or slowly cooled.

When it is desired to imitate natural jewel bearings, a sufficient amount of coloring matter is introduced into the mixture from which the glass is originally made, or to the granulated material.

As a modification of the process heretofore outlined, it is preferred in some instances to form the constituent material or base in two separate batches one of which has a less tendency to deform than the other, that is, is more viscous when heated to the same temperature, for example, one batch may be of the feldspar-clay glass heretofore described whereas the other, or second, batch may be of the lower-fusing pure feldspar. The die is then partly filled with material of the first batch which is compressed or partly so by a stroke of the die, whereupon additional material of the second batch is fed in and subsequently compressed upon the body first formed to thereby complete the pellet or shape. When the bearings thus produced are fired or baked the thin veneer of the second material fuses more readily than the body, thus resulting in a facing which is better glazed than the body and which presents a more smooth surface after heat treatment as previously described. The body remaining more rigid on account of its greater viscosity or higher fusibility or deformation point, lends stability to the whole pellet.

The invention further comprises the production of bearings as heretofore described whether or not formed from pre-melted glass, that is, they may be formed from a non-fused base of substantially the same raw material or materials, screened, granulated, compressed and heat-treated (without pre-melting) in the manner outlined above, but the resultant articles are more subject to shrinkage and otherwise less desirable than when formed in the preferred manner heretofore stated.

We claim:

1. Those steps in the manufacture of jewel bearings and the like consisting in forming compressed pellets of ceramic material having a high viscosity when fused, supporting said pellets in powdered material having a higher fusion point than said pellets, and heating said pellets while so supported to cause fusion without appreciable deformation.

2. Those steps in the manufacture of jewel bearings and the like consisting in forming compressed pellets of ceramic material having a high viscosity when fused, supporting said pellets in powdered aluminum oxide or the like, fusing said pellets while so supported, and annealing said pellets.

3. The process of manufacturing synthetic jewel bearings and the like, which consists in forming a glass having a high viscosity when fused and a high degree of hardness when cold, reducing said glass to powder, granulating said powder, compressing said granulated powder into pellets, fusing said pellets while supported on powdered material to which they do not adhere when hot, and heat treating said fused pellets to cause slow cooling thereof.

4. That improvements in the art of making jewel bearings or the like, which consists in forming a highly viscous glass, incorporating therewith by fusion at a temperature considerably above the melting point of the ingredients of said glass a hardening material, reducing the hard glass thus formed to a powder, forming said powder into compressed shapes, and heating said shapes to fuse the particles of same into the desired articles.

5. That improvement in the art of making jewel bearings or the like, which consists in forming a highly viscous glass, reducing said glass to a powder, granulating the powder and compressing it into pellets, supporting said pellets in a bed of powdered material having a much higher fusion point than said pellets, heating said pellets while so supported to cause fusion, and annealing said pellets.

6. The process of manufacturing a synthetic jewel bearing or the like, which consists in forming a plurality of batches of ingredients which, when fused, form glass of high viscosity, one of said batches having a higher fusing point than the other, compressing from material of the batch of relatively high fusion point a body for the bearing, compressing additional material from the other batch with said body to form a facing, fusing said bearing while supported on powdered material to which it will not adhere when fused, and annealing said fused bearing.

7. The process of manufacturing jewel bearings and the like, which consists in reducing glass, having high properties of viscosity when fused and hardness when cool, to a powder, forming said powder into compressed pellets, heating said pellets to a fused condition, arresting said heating between the temperature at which a sastifactory fused surface is formed and that at which the original shape impressed on the pellet is no longer satisfactorily retained, and further heat-treating the jewels to insure toughness.

8. Those steps in the manufacture of jewel bearings and the like, consisting in forming a batch of powdered material which when fused will produce glass of high viscosity, incorporating therewith a granulating agent, screening the granulated material to eliminate the smaller particles and to insure a product capable of flowing freely, compressing such material to form pellets, and fusing said pellets at a temperature less than at which they would become objectionably deformed.

9. Those steps in the manufacture of die-shaped ceramic articles which consist in forming powdered material capable of producing glass on fusion, mixing therewith a lubricant, highly compressing the mixture of said material and lubricant to form the desired permanent shape, and thereafter fusing the material.

In testimony whereof we affix our signatures.

TAINE G. McDOUGAL.
SAMUEL J. McDOWELL.